(12) United States Patent
Troy

(10) Patent No.: US 12,106,433 B2
(45) Date of Patent: Oct. 1, 2024

(54) GENERATING EQUIRECTANGULAR IMAGERY OF A 3D VIRTUAL ENVIRONMENT

(71) Applicant: The Boeing Company, Chicago, IL (US)

(72) Inventor: James J. Troy, Issaquah, WA (US)

(73) Assignee: The Boeing Company, Arlington, VA (US)

( * ) Notice: Subject to any disclaimer, the term of this patent is extended or adjusted under 35 U.S.C. 154(b) by 128 days.

(21) Appl. No.: 17/658,159

(22) Filed: Apr. 6, 2022

(65) Prior Publication Data

US 2022/0343595 A1 Oct. 27, 2022

Related U.S. Application Data

(60) Provisional application No. 63/178,989, filed on Apr. 23, 2021.

(51) Int. Cl.
*G06T 17/05* (2011.01)
*G06T 17/20* (2006.01)

(52) U.S. Cl.
CPC .............. *G06T 17/05* (2013.01); *G06T 17/20* (2013.01)

(58) Field of Classification Search
CPC .............. H04N 13/111; H04N 13/282; H04N 2013/0088; G06T 17/05; G06T 17/20
See application file for complete search history.

(56) References Cited

U.S. PATENT DOCUMENTS

| 6,947,059 | B2 * | 9/2005 | Pierce | H04N 5/2628 348/E13.008 |
|---|---|---|---|---|
| 9,881,425 | B1 | 1/2018 | Scott et al. | |
| 2011/0102596 | A1 * | 5/2011 | Kotani | H04N 13/111 382/154 |
| 2011/0273451 | A1 * | 11/2011 | Salemann | G06T 15/20 345/427 |
| 2018/0025543 | A1 * | 1/2018 | Troy | G06T 19/003 345/419 |
| 2018/0124310 | A1 * | 5/2018 | Taneichi | H04N 21/234 |
| 2018/0181367 | A1 * | 6/2018 | Goi | G06F 1/163 |

(Continued)

OTHER PUBLICATIONS

"Cold War Gallery Cockpits," National Museum U.S. Air Force, Available Online at http://www.nmusafvirtualtour.com/cockpits/CW_tour/CW-35.html, Available as Early as May 27, 2017, 1 page.

(Continued)

*Primary Examiner* — Antonio A Caschera
(74) *Attorney, Agent, or Firm* — Alleman Hall & Tuttle LLP

(57) ABSTRACT

An equirectangular image of a three-dimensional (3D) virtual environment is generated in a computer-automated fashion. In one example, a 3D virtual position of a virtual camera in a 3D virtual environment is specified. For each of a plurality of different yaw angles rotated about an axis extending through the 3D virtual position, the virtual camera is used to acquire an image strip of pixels parallel to the axis of rotation. Image strips of pixels of the 3D environment acquired at the different yaw angles are assembled to form an equirectangular image of the 3D virtual environment from the specified 3D virtual position.

20 Claims, 9 Drawing Sheets

(56) References Cited

U.S. PATENT DOCUMENTS

2018/0286026 A1* 10/2018 Fan .......................... G06T 5/50

OTHER PUBLICATIONS

"The J. Paul Getty Museum, Los Angeles, United States," Google Arts & Culture, Available Online at https://artsandculture.google.com/streetview/the-j-paul-getty-museum/cwFdGYSXlaOg6w, Available as Early as Jul. 7, 2020, 1 page.

"Panoramic photography," Wikipedia Website, Available Online at https://en.wikipedia.org/wiki/Panoramic_photography, Available as Early as Dec. 31, 2003, 9 pages.

"Presidential Gallery Cockpits, Air Force One, SAM 26000/Pilot Station," National Museum U.S. Air Force, Available Online at http://www.nmusafvirtualtour.com/cockpits/P_tour/P-13.html, Available as Early as Nov. 7, 2016, 1 page.

"Presidential Gallery Cockpits, Air Force One, SAM 26000/Flight Deck Overview," National Museum U.S. Air Force, Available Online at http://www.nmusafvirtualtour.com/cockpits/P_tour/P-16.html, Available as Early as Feb. 15, 2017, 1 page.

"Presidential Gallery Cockpits, Air Force One, SAM 26000/Presidential Gallery," National Museum U.S. Air Force, Available Online at http://www.nmusafvirtualtour.com/cockpits/P_tour/P-24.html, Available as Early as Apr. 3, 2017, 1 page.

"Rotating line camera," Wikipedia Website, Available Online at https://en.wikipedia.org/wiki/Rotating_line_camera, Available as Early as Sep. 13, 2006, 2 pages.

* cited by examiner

GENERATING EQUIRECTANGULAR IMAGERY OF A 3D VIRTUAL ENVIRONMENT

CROSS REFERENCE TO RELATED APPLICATIONS

This application claims priority to U.S. Provisional Patent Application Ser. No. 63/178,989, filed Apr. 23, 2021, the entirety of which is hereby incorporated herein by reference for all purposes.

FIELD

The present disclosure relates generally to three-dimensional (3D) virtual environments, and more specifically, to generating equirectangular imagery of a 3D virtual environment.

BACKGROUND

A three-dimensional (3D) virtual environment can provide a visual experience that simulates a user's physical presence in the virtual environment. A 3D virtual environment may be represented by one or more 3D models that are formed using a collection of points in 3D space, in some cases with the points being connected by triangles, lines, curved surfaces, etc. Rendering a 3D virtual environment from 3D models may be computationally intensive and may require specialized computer software/hardware.

SUMMARY

Examples are disclosed that relate to generating an equirectangular image of a three-dimensional (3D) virtual environment in a computer-automated fashion. In one example, a 3D virtual position of a virtual camera in a 3D virtual environment is specified. For each of a plurality of different yaw angles rotated about an axis extending through the 3D virtual position, the virtual camera is used to acquire an image strip of pixels parallel to the axis of rotation. Image strips of the 3D environment acquired at the plurality of different yaw angles are assembled to form an equirectangular image of the 3D virtual environment from the specified 3D virtual position.

The features, functions, and advantages that have been discussed can be achieved independently in various embodiments or may be combined in yet other embodiments, further details of which can be seen with reference to the following description and drawings.

DETAILED DESCRIPTION

Figure 1A:
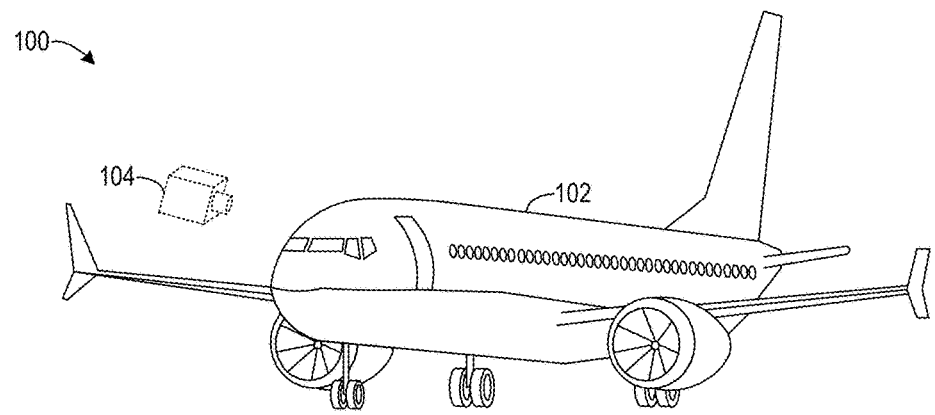
FIGS. 1A-1C show different example aspects of an aircraft that may be modeled in a three-dimensional (3D) virtual environment.

Rendering a 3D virtual environment from a 3D model can be graphically and computationally intensive. In many cases, powerful/specialized hardware and software is needed. For example, many CAD applications have large memory requirements and require a high-performance graphics processor. Such computing requirements can limit the type of computing device that can be used to view a rendered 3D virtual environment from different virtual perspectives.

Accordingly, an approach is presented herein for creating synthetic (computer generated) equirectangular images directly from a 3D virtual environment rendered based on one or more 3D models. These images can provide an effective simulation of the 3D environment from specified virtual positions. In one example, a 3D virtual position of a virtual camera in a 3D virtual environment is specified. For each of multiple different yaw angles about an axis extending through the virtual position, the camera acquires an image strip of pixels of the 3D virtual environment, with the image strip being parallel to the axis of rotation. Image strips of pixels acquired at the different yaw angles are assembled to form an equirectangular image of the 3D virtual environment from the point of view of the specified 3D virtual position. The equirectangular image may be output to a file that may be read as appropriate by any suitable device or output to another consumer of the equirectangular image.

In some examples, such an approach can be computer-automated to generate a series of synthetic equirectangular images from different virtual positions in the 3D virtual environment. Such an approach allows for the display of 3D model data without the need for high-performance graphics cards or other specialized software/hardware. Instead, for example, the synthetic equirectangular images can be interactively viewed in an application such as a web browser running on a modestly-equipped device.

Equirectangular images and projection as discuss herein relate to mapping of a flat rectangular image—i.e., an equirectangular image—to the surface of a sphere (or equivalently, mapping the surface of a sphere to a flat rectangular image). Such mapping may be applied to an equirectangular image to provide a 360° point of view of a 3D virtual environment from a designated virtual position. Furthermore, equirectangular images may be generated at a plurality of different 3D virtual positions within the environment to allow for a "virtual tour" the 3D virtual environment from the different 3D virtual positions.

Furthermore, since the synthetic equirectangular images are computer generated directly from the 3D virtual environment, when aspects of the underlying 3D model(s) of the 3D virtual environment are changed, new equirectangular images can be quickly acquired to reflect the changes to the 3D virtual environment. Such features may allow for interested viewers (designers, clients, customers, etc.) to see an as-designed version of a product, for example to aid in collaborating on design changes without requiring the viewer to user specialized computing devices.

Moreover, such synthetic equirectangular imagery may be generated relatively quickly as design changes occur. Such imagery is difficult/impossible to obtain with a photograph-based equirectangular image generation approach, because such photograph-based imagery would depend on modifying a physical prototype (or building a new one) before corresponding equirectangular images could be acquired. In addition, the acquisition of photograph-based equirectangular images (either on photographic film or digitally) may take a significant amount of time to travel to the actual location, setup the photographic equipment, and physical perform the image acquisition process.

The herein-described approach for creating synthetic equirectangular images directly from a 3D virtual environment may be broadly applicable to any suitable type of virtual object or virtual environment in any suitable type of application. For ease of explanation, the discussion of such an approach is limited to the context of designing aircraft and/or aviation components.

Figure 1B:
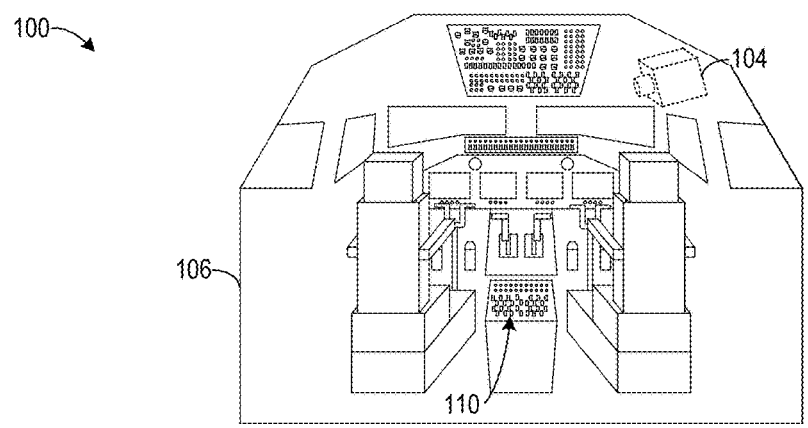
Figure 1C:
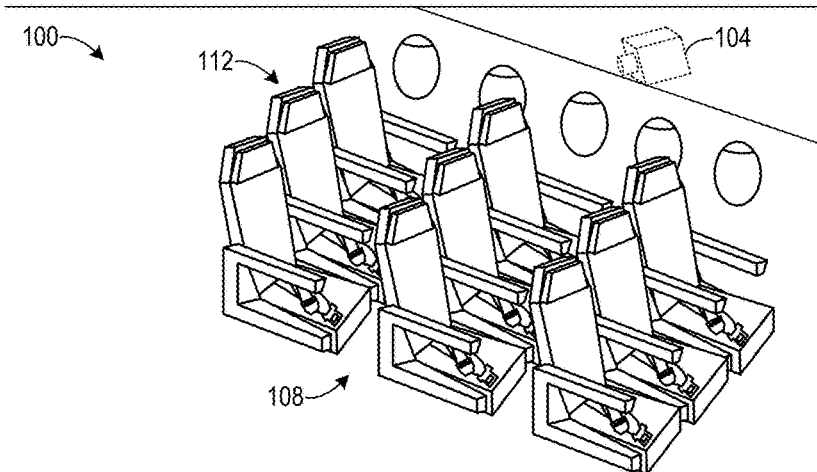

FIGS. 1A-1C show different virtual perspectives of an example 3D virtual environment 100 including a virtual aircraft 102. For example, synthetic equirectangular images may be generated from these virtual perspectives using the approach described herein.

FIG. 1A shows an exterior view of the virtual aircraft 102. A virtual camera 104 may be placed at any suitable 3D virtual position in the 3D virtual environment 100 to establish a virtual perspective view of the aircraft 102. For example, the virtual camera 104 may be positioned to view any 3D modeled component of the aircraft 102 that is part of the 3D virtual environment including, but not limited to, wings, flaps, turbines, doors, windows, landing gear, and/or the tail among other 3D modeled components of the aircraft 102. Note that the virtual camera 104 is indicated in dotted lines to distinguish it from the other modeled components, because the virtual camera is not actually rendered in the 3D virtual environment.

FIG. 1B shows a view of a virtual cockpit 106 of the virtual aircraft 102. The virtual camera 104 may be placed at any suitable 3D virtual position in the 3D virtual environment 100 to establish a virtual perspective view of the virtual cockpit 106. The virtual camera 104 may be positioned to view any 3D modeled component of the virtual cockpit 106 including, but not limited to, gauges, monitors, pedals, switches, yoke, seats, and/or windows among other 3D modeled components of the virtual cockpit 106.

FIG. 1C shows a view of a virtual cabin 108 of the virtual aircraft 102. The virtual camera 104 may be placed at any suitable 3D virtual position in the 3D virtual environment 100 to establish a virtual perspective view of the virtual cabin 108. For example, the virtual camera 104 may be positioned to view any 3D modeled component of the virtual cabin 108 including, but not limited to, seats, seat belts, windows, in-seat monitors, vents, and/or lights among other 3D modeled components of the virtual cabin 108.

The above-described scenarios are provided as non-limiting examples in which a 3D virtual position of a virtual camera may be specified in a 3D virtual environment to computer generate a synthetic equirectangular image to provide a 360° perspective view of the 3D virtual environment from the specified 3D virtual position. Such synthetic equirectangular imagery may provide a visualization of the 3D virtual environment without requiring specialized computing software/hardware to render the entire 3D virtual environment.

Figure 2:
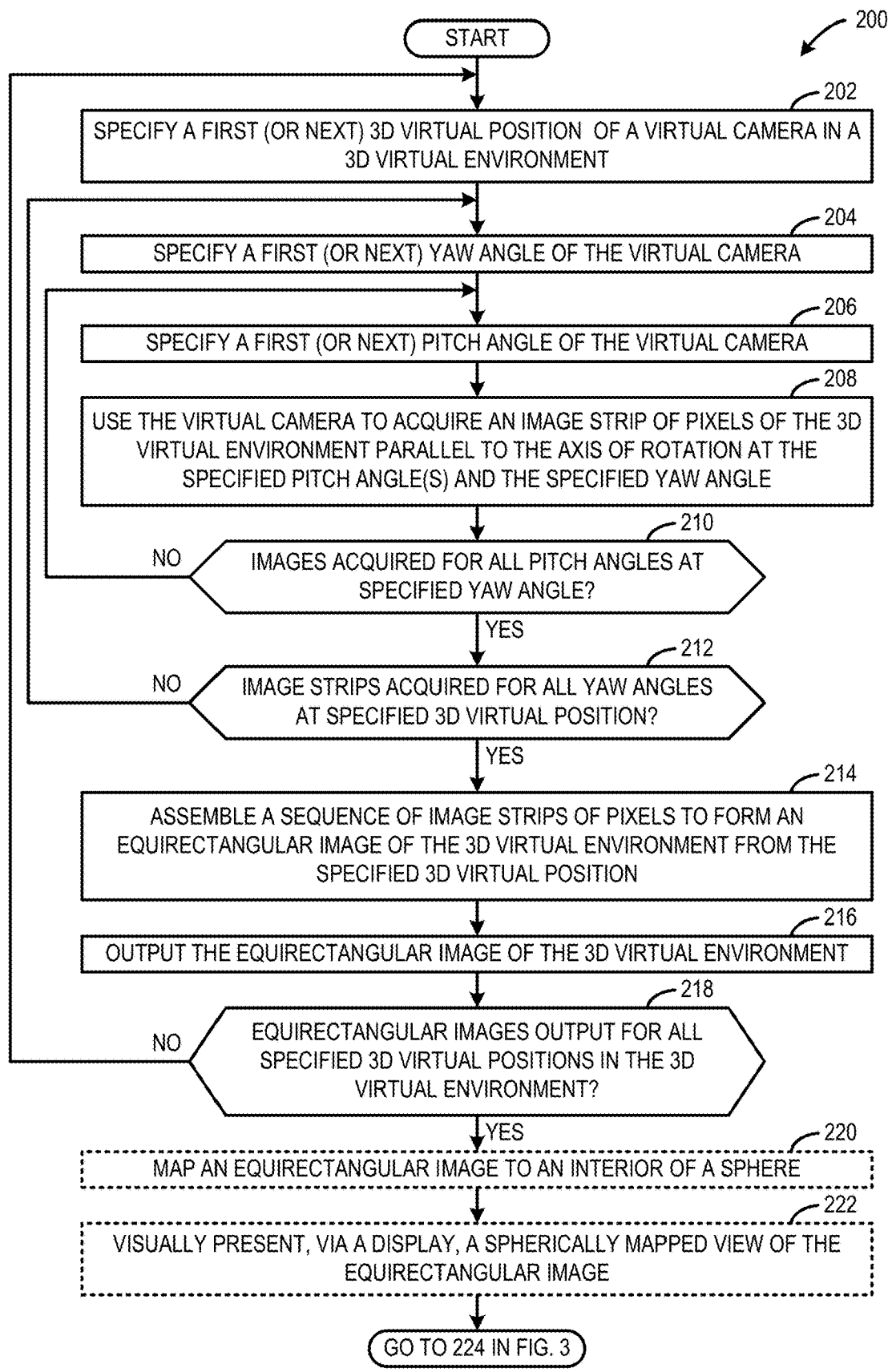
FIGS. 2-3 are a flowchart of an example computer-implemented method for generating an equirectangular image of a 3D virtual environment.

FIG. 2 shows an example computer-implemented method 200 for generating an equirectangular image from a 3D virtual environment. For example, the method 200 may be performed by the computer 902 shown in FIG. 9, the computing system 1000 shown in FIG. 10, or more generally any suitable computer having software/hardware specifications suitable to render a 3D virtual environment.

At 202, the method 200 includes specifying a first 3D virtual position of a virtual camera in a 3D virtual environment. In some instances, the specified 3D virtual position is defined in terms of three degrees of freedom (e.g., X, Y, Z). The 3D virtual position specifies a position where the virtual camera is placed in 3D space in order to generate the synthetic equirectangular image of the 3D virtual environment.

In some examples, the process leading up to specifying the 3D virtual position optionally may include setting various 3D visualization parameters of the 3D virtual environment. For example, such parameters may include loading 3D models, setting up lighting parameters, setting image orientation and resolution, and any other 3D visualization parameters (e.g., materials, textures, transparency).

The method 200 may be iteratively performed to acquire equirectangular images corresponding to any suitable number of desired 3D virtual positions in the 3D virtual environment (e.g., one, two, five, ten, or more different 3D virtual positions or configurations of the 3D virtual environment).

The virtual camera is used to acquire image strips of pixels of the 3D virtual environment parallel to the axis of rotation for each of a plurality of different yaw angles rotated about the axis extending through the 3D virtual position. At 204, the method 200 includes specifying a first yaw angle of the virtual camera about an axis of rotation extending through the specified 3D virtual position. At 206, the method 200 includes specifying a first pitch angle of the virtual camera at the specified yaw angle.

In some implementations, an image strip of pixels is formed from a single image acquired using the virtual camera. In other implementations, an image strip of pixels is formed from two or more images acquired using the virtual camera at different pitch angles. In such implementations, multiple discrete image acquisition steps may be performed with the virtual camera angled at the different pitch angles while maintaining the same yaw angle to form the image strip of pixels.

Figure 4D:
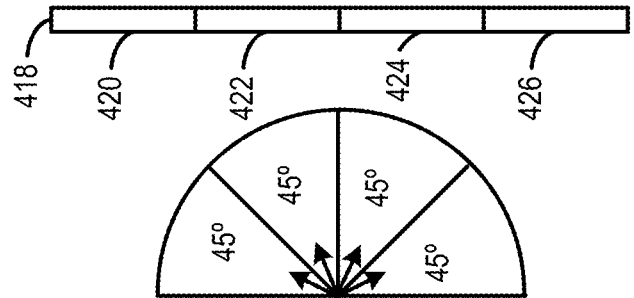
FIGS. 4A-4D show different example techniques for acquiring an image strip of pixels to form an equirectangular image of a 3D virtual environment.
Figure 4C:
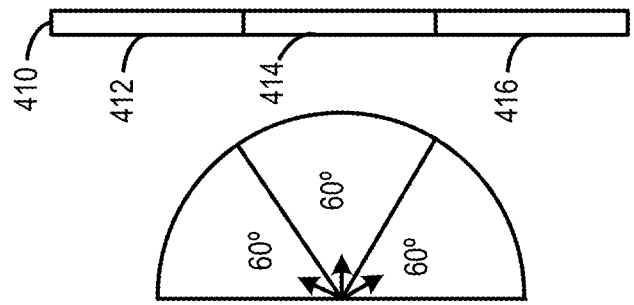
Figure 4B:
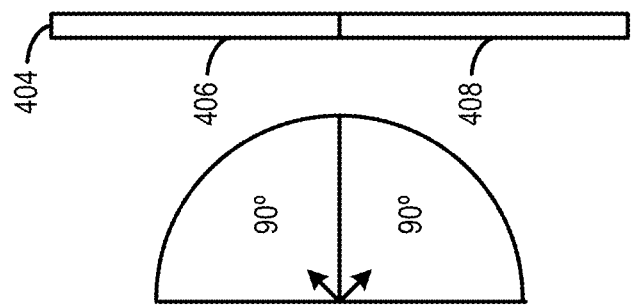
Figure 4A:
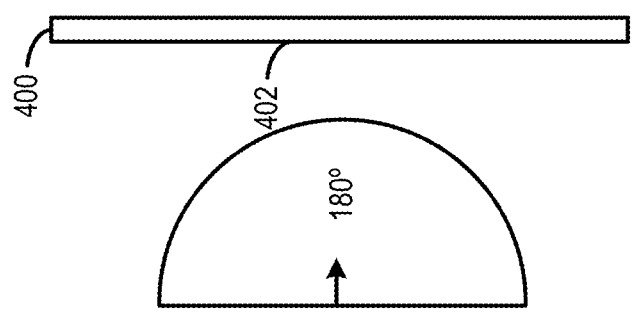

FIGS. 4A-4D show different examples of image strips of pixels formed from a different number of image acquisitions at different pitch angles. In FIG. 4A, an image strip 400 is formed from a single image 402 where the virtual camera has a 180° field-of-view (FoV) setting (similar to a "fisheye" lens). In the example, the pitch angle is perpendicular to the axis of rotation.

In FIG. 4B, an image strip 404 is formed from two images 406 and 408 that are combined together. The virtual camera is pitched up for the image 406 and pitched down for the image 408 such that the two images 406, 408 are 90° apart.

In FIG. 4C, an image strip 410 is formed from three images 412, 414, 416. The virtual camera is pitched up for the image 412, pitched perpendicular to the axis of rotation for the image 414, and pitched down for the image 416 such that the three images 412, 414, 416 are 60° apart.

In FIG. 4D, an image strip 418 is formed from four images 420, 422, 424, 426. The virtual camera is pitched up significantly for the image 420, pitched up moderately for the image 422, pitched down moderately for the image 424 and pitched down significantly for the image 426 such that the four images 420, 422, 424, 426 are 45° apart. An image strip of pixels used to generate a synthetic equirectangular image may be formed from any suitable number of images acquired using any suitable pitch angles. Generally, the greater the number of images used to form an image strip, the higher the resolution possible in the resulting equirectangular image. Further, multiple images may be combined in any suitable manner to form an image strip of pixels, such as rendering individual strips, or strip segments, on different processors or processor cores.

Returning to FIG. 2, at 208, the method 200 includes using the virtual camera to acquire an image strip of pixels of the 3D virtual environment parallel to the axis of rotation at the specified pitch angle and the specified yaw angle. The acquired image strip may be stored in memory of the computer.

Figure 5:
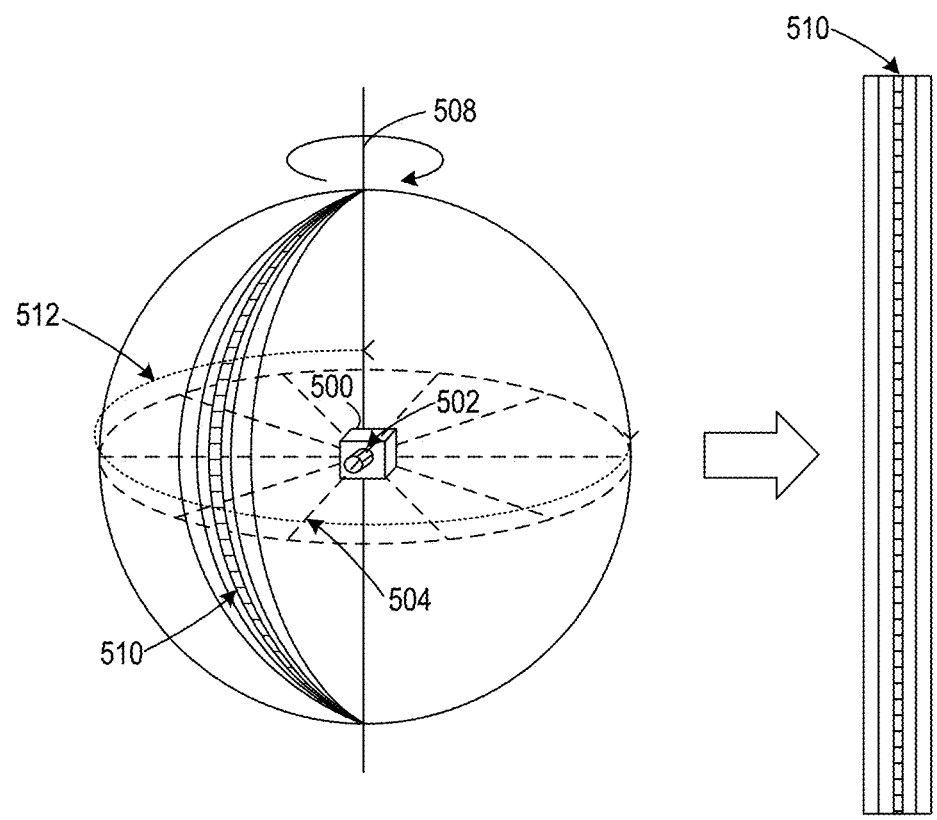
FIG. 5 shows an example scenario in which a viewing direction of a virtual camera is rotated about an axis extending through a 3D virtual position to acquire image strips of pixels, which are used to form an equirectangular image.

FIG. 5 shows an example scenario in which the virtual camera is used to acquire an image strip of pixels of a 3D virtual environment. The virtual camera 500 is placed at the specified 3D virtual position 502 pointing at the specified yaw angle 504. Optionally, if the image strip of pixels is to be formed from more than one image, the virtual camera may be pitched up or down away from perpendicular relative to an axis 508 of rotation that extends through the specified 3D virtual position 502 in the 3D virtual environment (as described in FIGS. 4B-4D).

In the illustrated example, the virtual camera 500 is positioned perpendicular to the axis 508 of rotation. The virtual camera 500 acquires an image strip 510 of pixels that is aligned parallel to the axis 508 of rotation. The image strip acquisition process is repeated with the virtual camera rotated about the axis 508 at multiple different yaw angles to acquire a plurality of image strips of pixels at the designated 3D virtual position.

An image strip of pixels may have any suitable pixel width. In some examples, the pixel width of an image strip is one pixel wide. In other examples, the pixel width of an image strip may be wider than one pixel, such as two, five, or ten pixels wide. Generally, image strips having a greater width may produce a synthetic equirectangular image having more strip-to-strip alignment errors, which reduces the quality of the synthetic equirectangular image relative to a synthetic equirectangular image formed from narrower image strips.

In some examples, a yaw angle step may vary about the axis of rotation 508, such that different image strips have different widths. For example, a yaw angle step change of 1 degree may correspond to a 1 pixel wide image strip for part of the equirectangular image, and a yaw angle step change of 2 degrees may correspond to a 2 pixel wide image strip for another part of the equirectangular image. Note that the ratio of pixels per degree of yaw is the same for both image strips.

In some implementations, a resolution of the image strips may vary across the synthetic equirectangular image. For example, an area of interest 512 may be specified (e.g., a specified yaw range around the axis of rotation (270° in the illustrated example)), and image strips within the area of interest may have a higher resolution than image strips outside the area of interest. In some examples, image strips having a higher resolution may be formed from more image acquisitions than image strips with lower resolution. In one example, image strips in the area of interest may be formed using the technique shown in FIG. 4D and image strips outside the area of interest may be formed using a technique that employs less image acquisitions, such as the examples shown in FIGS. 4A-4C. Acquired images strips with varying numbers of pixels can be scaled (e.g., using interpolation methods) along the length of the image strip to match the vertical resolution of the overall image before being combined with the other image strips. In some examples, images strips may not be acquired outside the area of interest 512.

A synthetic equirectangular image may be computer assembled from any suitable number of image strips acquired at any suitable corresponding number of different yaw angles rotated about axis 508. Moreover, a synthetic equirectangular image may be assembled from image strips covering any suitable range of rotation about the axis 508. In one example, the virtual camera 502 is rotated in a full 360° around the axis 508 of rotation while acquiring image strips at a specified rate or step change. In other examples, the virtual camera 502 may be rotated an angular range that is less than 360° around the axis 508 of rotation. For example, if the specified 3D virtual position of the virtual camera is adjacent a wall, then the range of rotation of the virtual camera may be set to 180°. In the example, the synthetic equirectangular image may not include most of the wall as it may not be of interest to a viewer of the synthetic equirectangular image.

In some implementations, multiple image strips and/or multiple equirectangular images optionally may be acquired in parallel (simultaneous) processes. For example, such parallel processing may be handled by one or more graphics processing units (GPUs) of the computer, one or more central processing units (CPUs) of the computer, and/or a combination thereof.

In some examples, such parallel processing may be performed by processing units of multiple computers, such as in a cloud computing system. Multiple image strips and/or multiple equirectangular images may be acquired in parallel using any suitable parallel processing techniques and/or technology. Such parallel processing may enable faster rendering of the equirectangular image(s) relative to an approach where individual image strips and/or individual equirectangular images are acquired one at a time.

Returning to FIG. 2, at 210, the method 200 includes determining that images have been acquired for all pitch angles of a specified yaw angle to form an image strip of pixels. If images have been acquired for all pitch angles at the specified yaw angle, then the method 200 moves to 212. Otherwise, the method 200 returns to 206 and a next pitch angle of the virtual camera is specified for acquisition of the next image to be used to form the image strip of pixels at the specified yaw angle.

At 212, the method 200 includes determining that image strips of pixels have been acquired for all yaw angles at the specified 3D virtual position. If all the image strips have been acquired, then the method moves to 214. Otherwise, the method 200 returns to 204 and a next yaw angle of the virtual camera is specified, and image acquisition continues in the manner discussed above.

At 214, the method 200 includes assembling a sequence of image strips of pixels of the 3D environment to form an equirectangular image of the 3D virtual environment acquired from the specified 3D virtual position. For example, the image strips acquired at the plurality of different yaw angles may be retrieved from memory of the computer and assembled in the same sequence in which the image strips were acquired using the virtual camera to form the equirectangular image of the 3D virtual environment.

Figure 6:
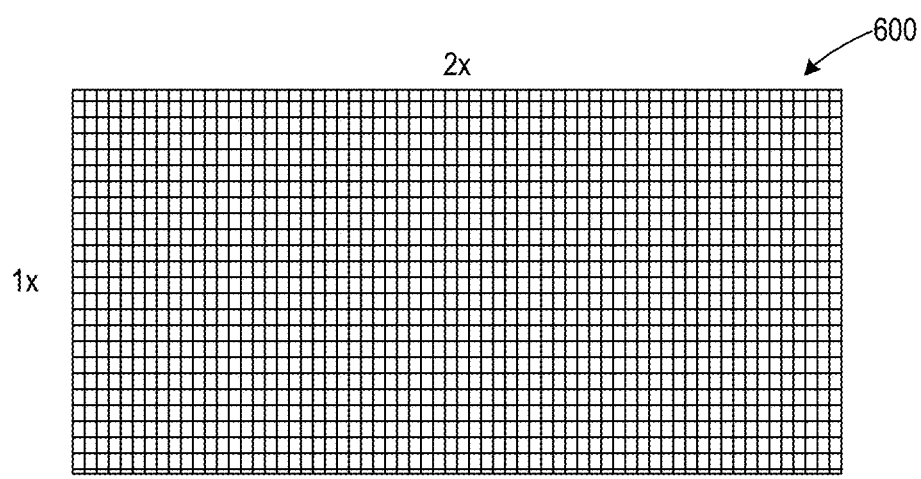
FIG. 6 shows an example equirectangular image formed from image strips of pixels.

FIG. 6 shows an example equirectangular image 600 assembled from a plurality of image strips of pixels at different yaw angles. In the illustrated example, the equirectangular image 600 has a width-to-height aspect ratio of 2:1, which is the ratio for an image with a full 360° yaw rotation and square pixels. In other words, the number of individual image strips is two times the number of vertical pixels specified for the equirectangular image 600. In other examples, an equirectangular image may have a different aspect ratio. For example, there could be implementations where it may be useful to have non-square pixels that form image strips that benefit from a different aspect ratio. In some examples, an equirectangular image may have a higher vertical resolution than horizontal resolution (or the other ways around). In such cases, the aspect ratio may be something other than 2:1. An equirectangular image may have any suitable aspect ratio.

Returning to FIG. 2, at 216, the method 200 includes outputting the equirectangular image of the 3D virtual environment. In some examples, the equirectangular image is output to a file and the file is stored in a local storage device of the computer. In other examples, outputting includes visually presenting the equirectangular image via a suitable display. In still other examples, outputting the equirectangular image includes sending the equirectangular image to another software component, such as an image editing program for additional image processing. In still yet other examples, the equirectangular image is output to a file and the file is sent to a remote computer. For example, the file corresponding to the equirectangular image may be sent to a remote computer that does not have specialized software/hardware capable of rendering the 3D virtual environment. Accordingly, such a computer may still be able to visually present aspects of the 3D virtual environment via the file of the equirectangular image.

Figure 7:
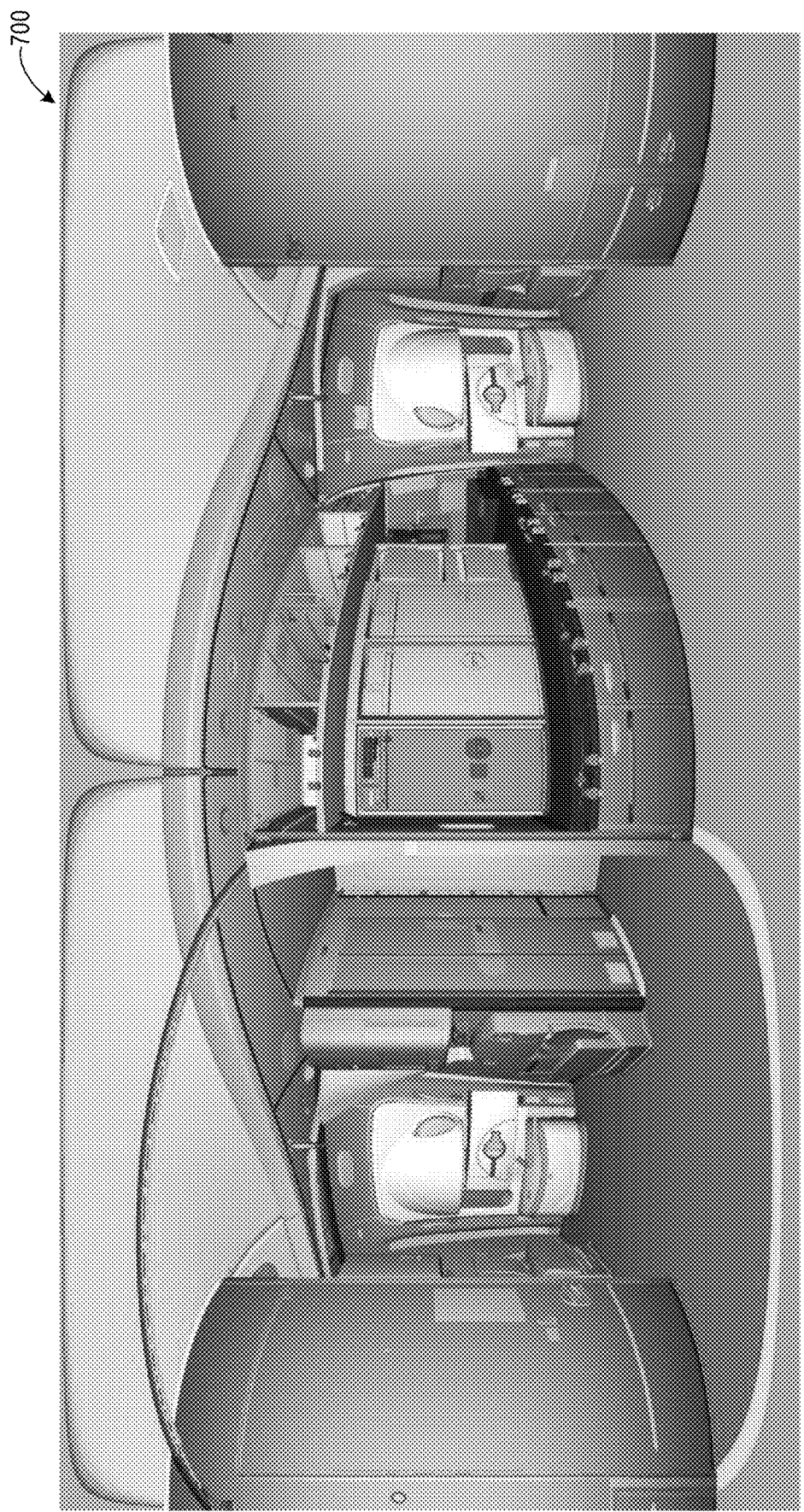
FIG. 7 shows an example equirectangular image of a 3D virtual environment.
Figure 8A:
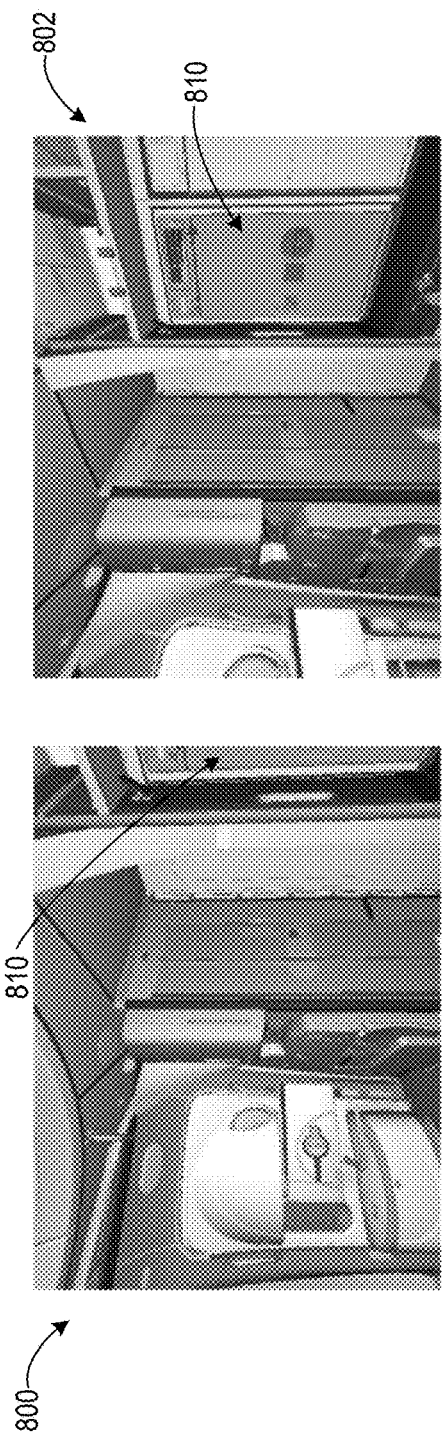
FIGS. 8A-8E show different example spherically-projected views of the equirectangular image shown in FIG. 7.
Figure 8B:
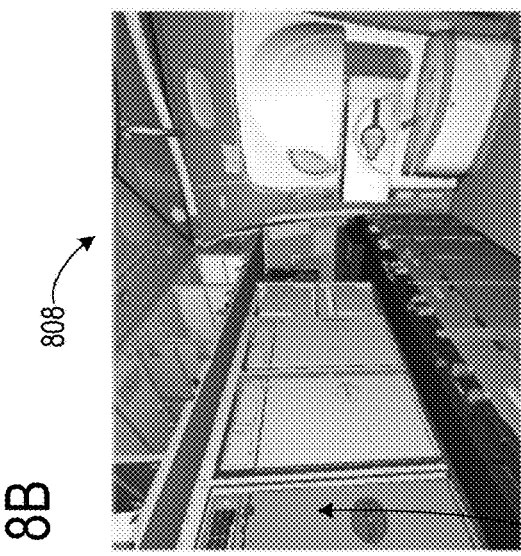

FIG. 7 shows an example equirectangular image 700 of a virtual 3D environment in the form of a virtual aircraft galley. The equirectangular image 700 represents a full 360° view of the galley area. In the illustrated flat-rectangular form, surfaces (e.g., walls, ceilings, floors) of the equirectangular image 700 appear to have a curved distortion. However, when the equirectangular image 700 is mapped to an interior of a sphere through spherical projection, the curves will appear as straight lines when viewed from the center of the sphere, as shown in FIGS. 8A-8C.

Returning to FIG. 2, at 218, the method 200 includes determining that equirectangular images have been output for all specified 3D virtual positions in the 3D virtual environment. In examples where multiple equirectangular images corresponding to different 3D virtual positions in the 3D virtual environment are output, these equirectangular images optionally may be arranged to form a multi-position "virtual tour" of the 3D virtual environment. If equirectangular images have been output for all specified 3D virtual positions, then the method 200 moves to 220. Otherwise, the method returns to 202, a next 3D virtual position in the 3D virtual environment is specified and additional equirectangular image(s) are acquired according to the method described above.

In some implementations, at 220, the method 200 optionally may include mapping an equirectangular image to an interior of a sphere. At 222, the method 200 optionally may include visually presenting, via a display, a spherically-mapped view of the equirectangular image. For example, the spherically-mapped view of the equirectangular image may be visually presented with a standard spherical projection viewer (or panoramic viewer) software application. Visually presenting a spherically-mapped view of the equirectangular image allows a viewer to change the orientation of the virtual perspective without moving from the 3D virtual position to view different regions of the 3D virtual environment. Accordingly, the viewer may be visually presented with a visualization experience that simulates the viewer actually being in the 3D virtual environment.

Returning to the aircraft example, an equirectangular image may be formed for a 3D virtual position located within a cabin of the aircraft. When a spherically-mapped view of such an equirectangular image is visually presented, the viewer may rotate the orientation of the virtual perspective view one direction to view one portion of the cabin, such as a galley, and rotate the orientation in another direction to view a different portion of the cabin, such as a seating area.

Figure 8D:
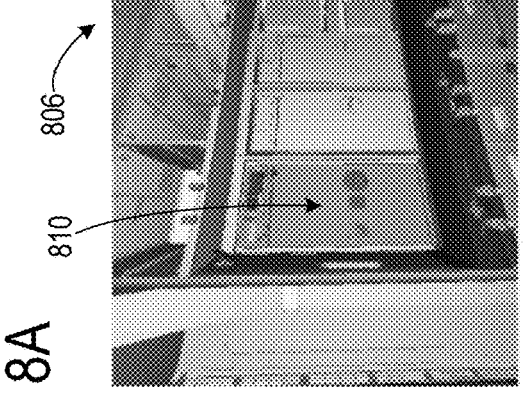
Figure 8E:
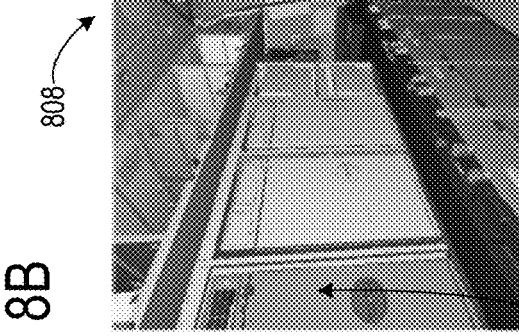
Figure 8C:
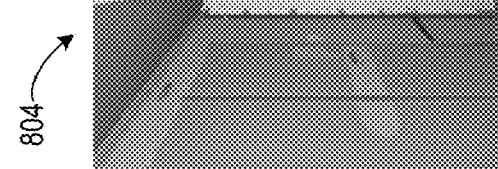

FIGS. 8A-8E show different spherically-mapped views of the equirectangular image 700 show in FIG. 7. Each of the views shown in FIGS. 8A-8E show a different virtual perspective view of the virtual galley region of an aircraft cabin from the same 3D virtual position (center point) in the 3D virtual environment. View 800 shown in FIG. 8A is based on a first orientation of the virtual camera. View 800 focuses on an exterior door of the aircraft. View 802 shown in FIG. 8B is rotated around the vertical (yaw) axis in a rightward direction and with a slight upward pitch rotation relative to the view 800 shown in FIG. 8A. View 802 rotates away from the exterior door and begins to focus on a bank of storage compartments. View 804 shown in FIG. 8C is rotated about the vertical axis in a rightward direction relative to the view 802 shown in FIG. 8B. View 804 focuses directly on the bank of storage compartments. View 806 shown in FIG. 8D is rotated about the vertical axis in a rightward direction relative to the view 804 shown in FIG. 8C. View 806 focuses on a far-right end of the bank of compartments. View 808 shown in FIG. 8E is rotated about the vertical axis in a rightward direction and with a slight downward pitch rotation relative to the view 806 shown in FIG. 8D. View 808 rotates away from the bank of compartments and focuses again on the exterior door.

In other words, the views shown in FIGS. 8A-8E collectively depict rotation in 360° about the specified 3D position in the 3D virtual environment. The view shown in FIGS. 8A-8E are meant to be non-limiting. The orientation (e.g., roll, pitch, and yaw) of the virtual perspective view of the virtual camera may be adjusted in any suitable manner to produce any suitable view of a spherically-mapped equirectangular image.

Figure 3:
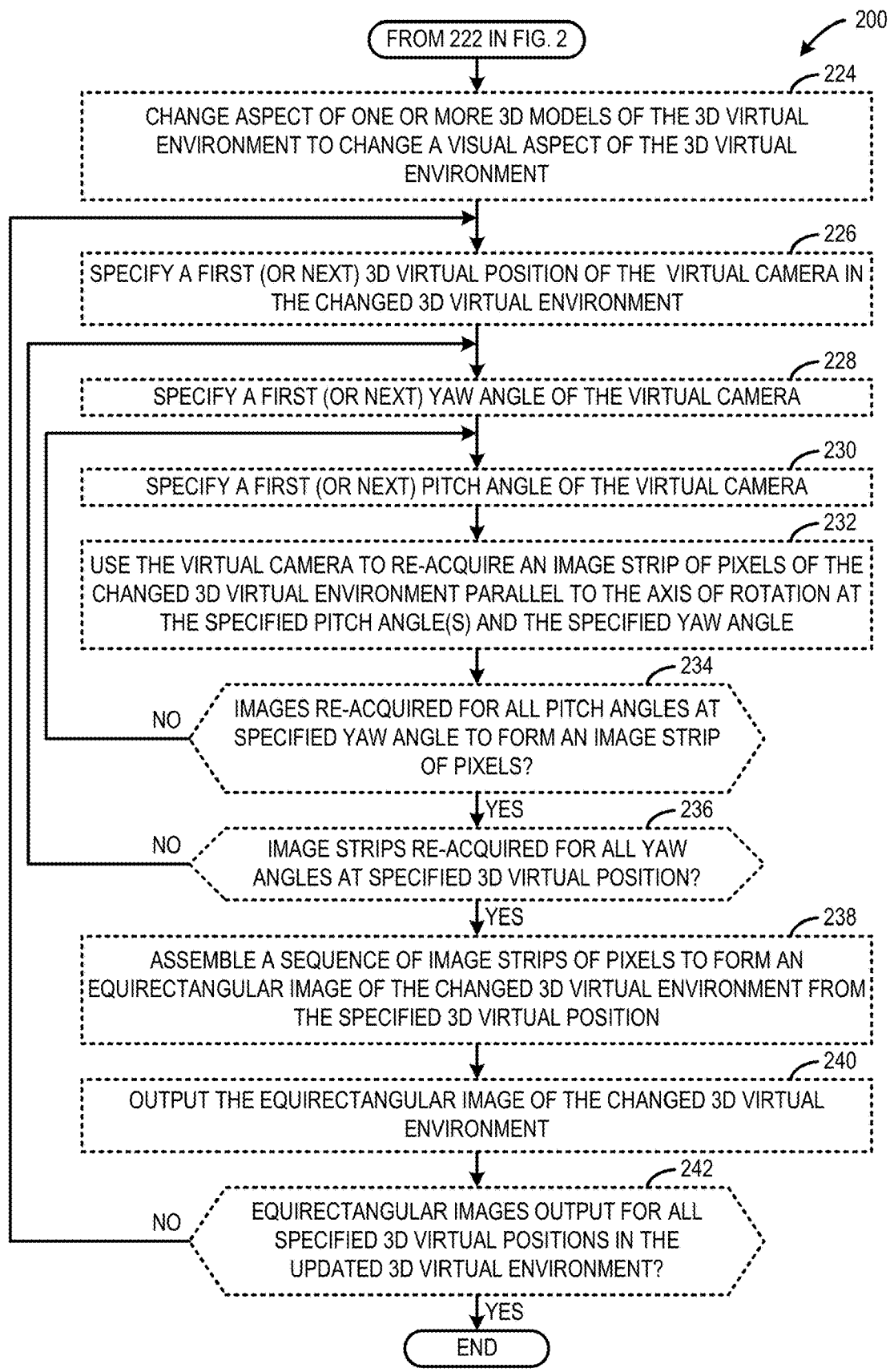

Turning to FIG. 3, in some implementations, at 224, the method 200 optionally may include changing some aspect of one or more 3D models of the 3D virtual environment to change a visual aspect of the 3D virtual environment. In some examples, changing some aspect of one or more 3D models includes modifying an existing 3D model. In other examples, changing some aspect of one or more 3D models includes adding a new 3D model. In still other examples, changing some aspect of one or more 3D models includes removing an existing 3D model from the 3D virtual environment.

In another aircraft example shown in FIGS. 8A-8E, a 3D model corresponding to a door 810 of a compartment may be changed from a closed state to an open state in the 3D model to reveal an interior space of the compartment. In the example, equirectangular images corresponding to the closed state and the open state of the compartment may be alternately visually presented to provide a sense of dynamic interaction with the compartment even though the individual equirectangular images are static. As another example, the positions/states of controls 110 in the virtual cockpit 106 shown in FIG. 1B may be changed in the 3D model between on and off states to indicate different flight conditions. As yet another example, seats 112 of different size/shape/color may be switched out or moved in the virtual cabin 108 shown in FIG. 1C. For example, such a change in visual appearance of the 3D virtual environment reflected in the different equirectangular images may allow a designer to make a quick decision during the design process about which configuration to use going forward. Any suitable visual aspect of the 3D models may be changed including, but not limited to, color, texture, lighting, object shape, and any other visual aspects.

At 226, the method 200 optionally may include specifying a first 3D virtual position of a virtual camera in the changed 3D virtual environment. At 228, the method 200 includes specifying a first yaw angle of the virtual camera about an axis of rotation extending through the specified 3D virtual position. At 230, the method 200 optionally may include specifying a first pitch angle of the virtual camera at the specified yaw angle. At 232, the method 200 optionally may include using the virtual camera to re-acquire an image strip of pixels of the changed 3D virtual environment parallel to the axis of rotation at the specified pitch angle and the specified yaw angle. The re-acquired image strip may be stored in memory of the computer.

At 234, the method 200 optionally may include determining that images are re-acquired for all pitch angles of a specified yaw angle to form an image strip of pixels. If images are re-acquired for all pitch angles at the specified yaw angle, then the method 200 moves to 236. Otherwise, the method 200 returns to 228 and a next pitch angle of the virtual camera is specified for re-acquisition of the next image to be used to form the image strip of pixels at the specified yaw angle.

At 236, the method 200 optionally may include determining that image strips of pixels are re-acquired for all yaw angles at the specified 3D virtual position. If all the image strips have been re-acquired, then the method moves to 238. Otherwise, the method 200 returns to 228 and a next yaw angle of the virtual camera is specified, and image acquisition continues in the manner discussed above.

At 238, the method 200 optionally may include assembling, in the proper sequence, image strips of pixels of the changed 3D environment to form an equirectangular image of the changed 3D virtual environment from the specified 3D virtual position. For example, the image strips re-acquired at the plurality of different yaw angles may be retrieved from memory of the computer and assembled in the same sequence in which the image strips were acquired using the virtual camera to form the equirectangular image of the changed 3D virtual environment.

At 240, the method 200 optionally may include outputting the equirectangular image of the changed 3D virtual environment. In some examples, the equirectangular image is output to a file and the file is stored in a local storage device of the computer. In other examples, the file is sent to a remote computer. In still other examples, outputting includes visually presenting the equirectangular image via a suitable display, such as a monitor, head-mounted display, tablet display, smartphone display, or another type of display.

At 242, the method 200 optionally may include determining that equirectangular images have been output for all specified 3D virtual positions in the updated 3D virtual environment. In examples where multiple equirectangular images corresponding to different 3D virtual positions in the updated 3D virtual environment are output, these equirectangular images optionally may be arranged to form a multi-position "virtual tour" of the 3D virtual environment. In some examples, equirectangular images acquired for the version of the 3D virtual environment prior to the 3D virtual environment being updated may be combined with equirectangular images acquired after the 3D virtual environment has been updated in a "virtual tour" that visualizes changing states of the 3D virtual environment. If equirectangular images have been output for all specified 3D virtual positions in the updated 3D virtual environment, then the method 200 ends. Otherwise, the method returns to 226, a next 3D virtual position in the 3D virtual environment is specified and additional equirectangular image(s) are acquired according to the method described above.

As discussed above, in some examples the equirectangular image corresponding to the initial 3D virtual environment and the equirectangular image corresponding to the changed 3D virtual environment may be visually presented in concert to simulate dynamic changes to the 3D virtual environment even though each individual equirectangular image is static. Such simulated dynamic interaction is made possible by the ability to change visual aspects of the 3D objects in the 3D virtual environment. Such visual changes would be much more difficult and time consuming to carryout in an approach that uses photographs of physical models in a real-world environment.

Note that steps of the method 200 that are indicated in dotted lines are optional and may be skipped or omitted in some examples. Further, note that optional steps 226-240 may be repeated for any suitable number of different 3D virtual positions in the changed 3D virtual environment. Further still, visual aspects of the 3D virtual environment may be changed any suitable number of times and new/additional equirectangular images may be formed to reflect these visual changes.

In some implementations, the above-described method can be performed via computer-automation to enable of the acquisition of a series of equirectangular images at different virtual camera positions or with alternate states of the 3D models (such as different states of assembly), with little or no human intervention.

Figure 9:
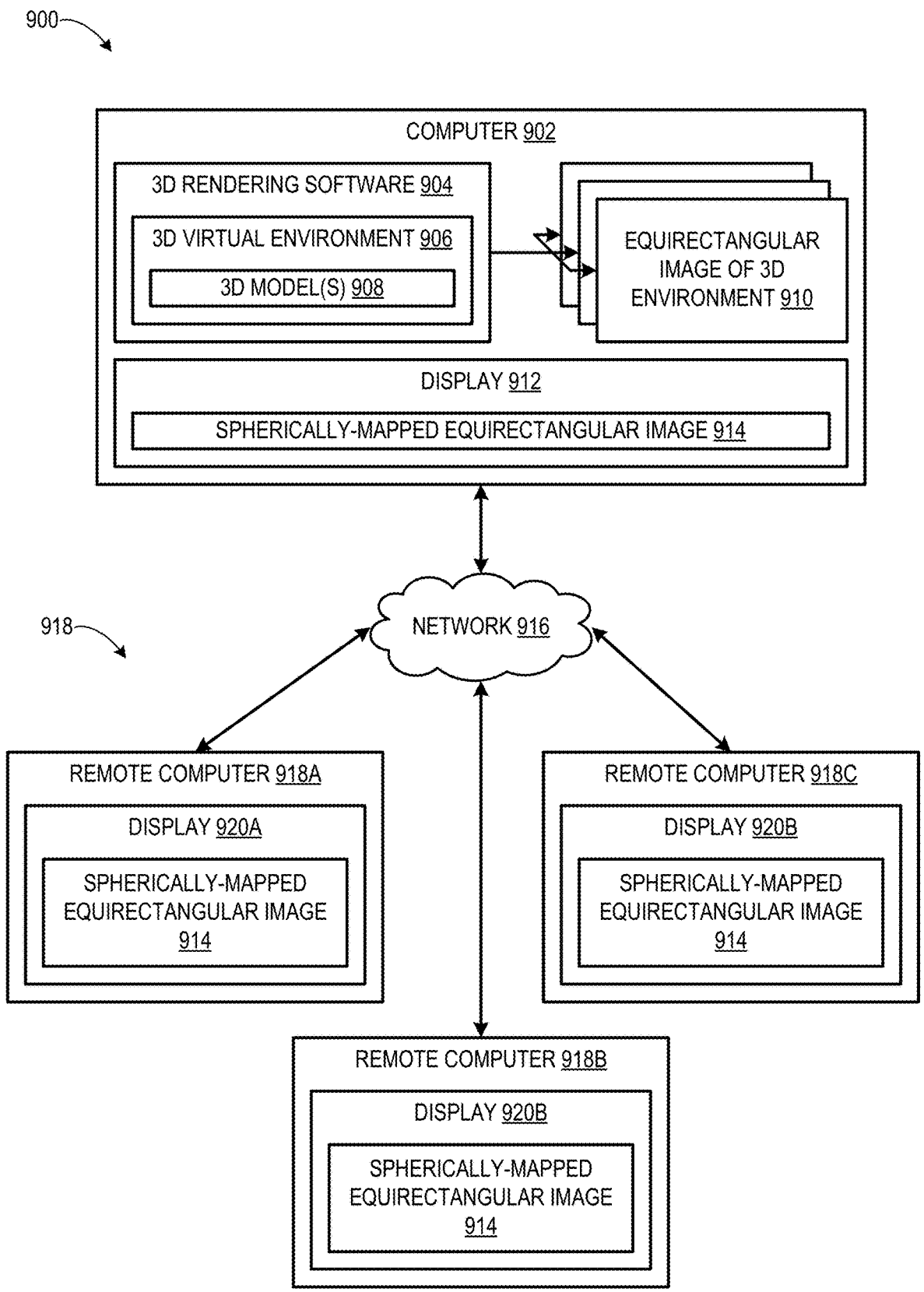
FIG. 9 is a block diagram of an example computing system for enacting the approaches described herein.

FIG. 9 shows an example computing system 900 that is configured to enact the methods and process described herein. A computer 902 is configured to execute 3D rendering software 904 that is capable of rendering a 3D virtual environment 906. The 3D rendering software 904 may take any suitable form. In one example, the 3D rendering software 904 may include computer-aided design (CAD) software. The 3D virtual environment 906 includes one or more 3D models 908. The 3D model(s) 908 may be formed using a collection of points in 3D space connected by various geometric entities such as triangles, lines, curved surfaces, etc. In some configurations, only the 3D points may be rendered (e.g., a point cloud). Rendering the 3D virtual environment 906 from the 3D model(s) 908 using the 3D rendering software 904 may be graphically and computationally intensive, and thus the computer 902 may have specialized computer hardware to perform such rendering. For example, the computer 902 may include a high-performance GPU chip.

The computer 902 is configured to acquire one or more equirectangular images 910 of the 3D models 908 in the 3D virtual environment 906 according to the methods and processes described herein. In some instances, different equirectangular images may be acquired from different 3D virtual positions in the 3D virtual environment. In some instances, different equirectangular image may be acquired based on visual changes to the 3D virtual positions (e.g., over the course of development of a product in the 3D virtual environment, or to simulate dynamic interaction with different states or modes of operation of a product in the 3D virtual environment).

In some implementations, multiple image strips and/or multiple equirectangular images optionally may be acquired in parallel processes. For example, such parallel processing may be handled by one or more GPUs of the computer 902, one or more CPUs of the computer 902, or a combination thereof. In some examples, such parallel processing may be performed by processing units of multiple computers, such as in a cloud computing system. In such examples, the multiple computers may be collectively represented by the computer 902. Multiple image strips and/or multiple equirectangular images may be acquired in parallel using any suitable parallel processing techniques and/or technology. Such parallel processing may enable faster rendering of equirectangular image(s) relative to an approach where individual image strips and/or individual equirectangular images are acquired one at a time.

Once the equirectangular image(s) 910 are acquired, the computer 902 may be configured to output such equirectangular image(s) 910 to different sources. In one example, said outputting may include outputting the equirectangular image(s) to one or more files and storing the files corresponding to the equirectangular image(s) 910 on a local storage device of the computer 902. In another example, said outputting may include visually presenting the equirectangular image(s) 910 via a display 912 of the computer. In yet another example, the computer 902 may be configured to map the equirectangular image(s) 910 to an interior of a sphere and visually present, via the display 912, a spherically-mapped equirectangular image(s) 914 to simulate a 3D view of the 3D virtual environment. In still yet another example, said outputting may include sending one or more files corresponding to the equirectangular image(s) 910 to a remote computer via a network 916, such as the Internet.

In the illustrated example, the computer 902 may send the one or more files corresponding to the equirectangular image(s) 910 to a plurality of remote computer 918 (e.g., remote computers 918A, 918B, 918C). The plurality of remote computers 918 may have limited processing capabilities or may lack specialized software that is capable of fully rendering the 3D virtual environment 906. Instead, the remote computers 918A, 918B, 918C may execute less computer-resource intensive applications, such as a standard spherical projection viewer (or panoramic viewer) application. Accordingly, the remote computers 918A, 918B, 918C may visually present spherically-mapped equirectangular image(s) 914 via corresponding displays 920A, 920B 920C to simulate rendering of the 3D virtual environment 906 without requiring specialized software/hardware to fully render the 3D virtual environment 906.

No aspect of the foregoing description or drawings should be interpreted in a limiting sense, for numerous variants lie within the spirit and scope of the disclosure. For instance, although examples are described within the context of aircraft, such equirectangular image acquisition methods are broadly applicable to many different industries and design applications.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 10:
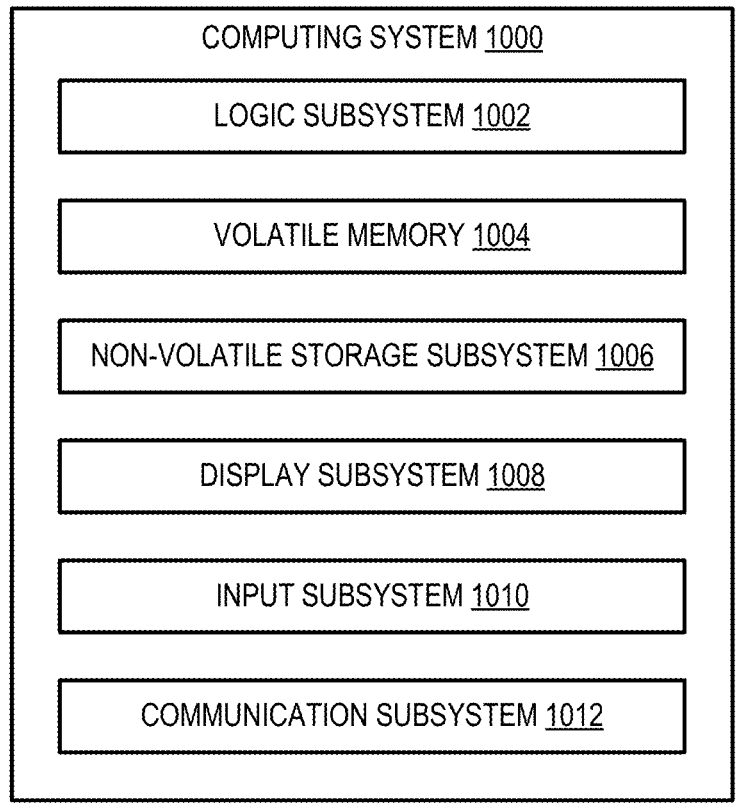
FIG. 10 is a block diagram of another example computing system for enacting the approaches described herein.

FIG. 10 schematically shows a non-limiting implementation of a computing system 1000 that can enact one or more of the methods and processes described above. Computing system 1000 is shown in simplified form. Computing system 1000 may take the form of one or more personal computers, server computers, tablet computers, home-entertainment computers, network computing devices, gaming devices, mobile computing devices, mobile communication devices (e.g., smart phone), wearable computing devices such as smart wristwatches and head mounted display devices, and/or other computing devices. For example, the computing system 1000 may correspond to any of the computers 902, 918A, 918B, 918C shown in FIG. 9. Further, the computing system 1000 may be configured to perform the method 200 shown in FIGS. 2 and 3.

Computing system 1000 includes a logic processor 1002, volatile memory 1004, and a non-volatile storage device 1006. Computing system 1000 may optionally include a display subsystem 1008, input subsystem 1010, communication subsystem 1012, and/or other components not shown in FIG. 10.

Logic processor 1002 includes one or more physical devices configured to execute instructions. For example, the logic processor 1002 may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 1002 may include one or more physical processors (hardware) configured to execute software instructions. Additionally or alternatively, the logic processor 1002 may include one or more hardware logic circuits or firmware devices configured to execute hardware-implemented logic or firmware instructions. Processors of the logic processor 1002 may be single-core or multi-core, and the instructions executed thereon may be configured for sequential, parallel, and/or distributed processing. Individual components of the logic processor 1002 optionally may be distributed among two or more separate devices, which may be remotely located and/or configured for coordinated processing. Aspects of the logic processor 1002 may be virtualized and executed by remotely accessible, networked computing devices configured in a cloud-computing configuration. In such a case, these virtualized aspects are run on different physical logic processors of various different machines, it will be understood. In some implementations, multiple image strips and/or multiple equirectangular images optionally may be acquired via parallel processing that is performed by multiple processors of the logic processor 1002. For example, such parallel processing may be handled by one or more GPUs, one or more CPUs, or a combination thereof of the logic processor 1002. In some examples, such parallel processing may be performed by processing units of multiple computers, such as in a cloud computing system.

Volatile memory 1004 may include physical devices that include random access memory. Volatile memory 1004 is typically utilized by logic processor 1002 to temporarily store information during processing of software instructions. It will be appreciated that volatile memory 1004 typically does not continue to store instructions when power is cut to the volatile memory 1004.

Non-volatile storage device 1006 includes one or more physical devices configured to hold instructions executable by the logic processor 1002 to implement the methods and processes described herein. When such methods and processes are implemented, the state of non-volatile storage device 1006 may be transformed—e.g., to hold different data.

Non-volatile storage device 1006 may include physical devices that are removable and/or built-in. Non-volatile storage device 1006 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1006 may include nonvolatile, dynamic, static, read/write, read-only, sequential-access, location-addressable, file-addressable, and/or content-addressable devices. It will be appreciated that non-volatile storage device 1006 is configured to hold instructions even when power is cut to the non-volatile storage device 1006.

Aspects of logic processor 1002, volatile memory 1004, and non-volatile storage device 1006 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The logic processor 1002, volatile memory 1004, and non-volatile storage device 1006 may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 1008 may be used to present a visual representation of data held by non-volatile storage device 1006. The visual representation may take the form of a graphical user interface (GUI). Display subsystem 1008 may include one or more display devices utilizing virtually any type of technology. In some implementations, display subsystem 1008 may include one or more virtual-, augmented-, or mixed reality displays.

When included input subsystem 1010 may comprise or interface with one or more input devices. An input device may include a sensor device or a user input device. Examples of user input devices include a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included communication subsystem 1012 may be configured to communicatively couple computing system 1000 with one or more other computing devices. Communication subsystem 1012 may include wired and/or wireless communication devices compatible with one or more different communication protocols. The communication subsystem may be configured for communication via personal-, local- and/or wide-area networks.

In an example, a computer-implemented method comprises specifying a three-dimensional (3D) virtual position of a virtual camera in a 3D virtual environment, for each of a plurality of different yaw angles rotated about an axis extending through the 3D virtual position, using the virtual camera to acquire an image strip of pixels of the 3D virtual environment parallel to the axis of rotation, assembling image strips of pixels of the 3D environment acquired at the plurality of different yaw angles to form an equirectangular image of the 3D virtual environment from the specified 3D virtual position, and outputting the equirectangular image of the 3D virtual environment. In this example and/or other examples, the plurality of different yaw angles may collectively span a 360° rotation about the axis. In this example and/or other examples, the image strips of pixels may be assembled side-by-side to form the equirectangular image. In this example and/or other examples, the equirectangular image may have a 2:1 aspect ratio. In this example and/or other examples, the image strip of pixels may be one pixel wide. In this example and/or other examples, widths of image strips assembled to form the equirectangular image may vary. In this example and/or other examples, the image strip of pixels may be formed from a single image acquired using the virtual camera. In this example and/or other examples, the image strip of pixels may be formed from two or more images acquired using the virtual camera at different pitch angles. In this example and/or other examples, said outputting may include mapping the equirectangular image to an interior of a sphere, and visually presenting, via a display, a spherically-mapped view of the equirectangular image to simulate a 3D view of the 3D virtual environment. In this example and/or other examples, the computer-implemented method may further comprise specifying a plurality of different 3D virtual positions of a virtual camera in a 3D virtual environment, and for each specified 3D virtual position for each of a plurality of different yaw angles rotated about an axis extending through the specified 3D virtual position, using the virtual camera to acquire an image strip of pixels of the 3D virtual environment parallel to the axis of rotation, assembling image strips of pixels of the 3D environment acquired at the plurality of different yaw angles to form an equirectangular image of the 3D virtual environment from the specified 3D virtual position, and outputting the equirectangular image of the 3D virtual environment. In this example and/or other examples, the computer-implemented method may further comprise changing aspects of one or more 3D models of the 3D virtual environment to change a visual aspect of the 3D virtual environment, for each of the plurality of different yaw angles rotated about the axis extending through the 3D virtual position, using the virtual camera to re-acquire an image strip of pixels of the 3D virtual environment parallel to the axis of rotation, assembling the image strips of pixels of the 3D environment re-acquired at the plurality of different yaw angles to form an equirectangular image of the changed 3D virtual environment from the specified 3D virtual position, and outputting the equirectangular image of the changed 3D virtual environment.

In another example, a computer comprises a logic subsystem, a storage subsystem comprising instructions executable by the logic subsystem to specify a three-dimensional (3D) virtual position of a virtual camera in a 3D virtual environment, for each of a plurality of different yaw angles rotated about an axis extending through the 3D virtual position, use the virtual camera to acquire an image strip of pixels of the 3D virtual environment parallel to the axis of rotation, assemble image strips of pixels of the 3D environment acquired at the plurality of different yaw angles to form an equirectangular image of the 3D virtual environment from the specified 3D virtual position, and output the equirectangular image of the 3D virtual environment. In this example and/or other examples, the plurality of different yaw angles collectively may span a 360° rotation about the axis. In this example and/or other examples, the equirectangular image may have a 2:1 aspect ratio, and the image strip of pixels each may be one pixel wide. In this example and/or other examples, the image strip of pixels may be formed from a single image acquired using the virtual camera. In this example and/or other examples, the image strip of pixels may be formed from two or more images acquired using the virtual camera at different pitch angles. In this example and/or other examples, the instructions may be further executable by the logic subsystem to map the equirectangular image to an interior of a sphere, and visually present, via a display, a spherically-mapped view of the equirectangular image to simulate a 3D view of the 3D virtual environment. In this example and/or other examples, the instructions may be further executable by the logic subsystem to specify a plurality of different 3D virtual positions of a virtual camera in a 3D virtual environment, and for each specified 3D virtual position for each of a plurality of different yaw angles rotated about an axis extending through the specified 3D virtual position, use the virtual camera to acquire an image strip of pixels of the 3D virtual environment parallel to the axis of rotation, assemble image strips of pixels of the 3D environment captured at the plurality of different yaw angles to form an equirectangular image of the 3D virtual environment from the specified 3D virtual position, and output the equirectangular image of the 3D virtual environment. In this example and/or other examples, the instructions may be further executable by the logic subsystem to change aspects of one or more 3D models of the 3D virtual environment to change a visual aspect of the 3D virtual environment, for each of the plurality of different yaw angles rotated about an axis extending through the 3D virtual position, use the virtual camera to re-acquire an image strip of pixels of the 3D virtual environment parallel to the axis of rotation, assemble the image strips of pixels of the 3D environment re-acquired at the plurality of different yaw angles to form an equirectangular image of the changed 3D virtual environment from the specified 3D virtual position, and output the equirectangular image of the changed 3D virtual environment.

In yet another example, a computer-readable storage device holding instructions executable by a processor to specify a three-dimensional (3D) virtual position of a virtual camera in a 3D virtual environment, for each of a plurality of different yaw angles rotated about an axis extending through the 3D virtual position, use the virtual camera to acquire an image strip of pixels of the 3D virtual environment parallel to the axis of rotation, assemble image strips of pixels of the 3D environment acquired at the plurality of different yaw angles to form an equirectangular image of the 3D virtual environment from the specified 3D virtual position, and output the equirectangular image of the 3D virtual environment.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. A computer-implemented method comprising:
specifying a three-dimensional (3D) virtual position of a virtual camera in a 3D virtual environment;
for each of a plurality of different yaw angles rotated about an axis of rotation extending through the 3D virtual position, using the virtual camera to acquire an image frame of the 3D virtual environment from the 3D virtual position and extract an image strip of pixels from the image frame, the image strip of pixels being parallel to the axis of rotation;
assembling image strips of pixels of the 3D environment extracted from a sequence of image frames acquired at the plurality of different yaw angles side by side according to the sequence of image frames corresponding to the plurality of different yaw angles to form an equirectangular image of the 3D virtual environment from the specified 3D virtual position; and
outputting the equirectangular image of the 3D virtual environment.

2. The computer-implemented method of claim 1, wherein the plurality of different yaw angles collectively spans a 360° rotation about the axis.

3. The computer-implemented method of claim 1, wherein the equirectangular image has a 2:1 aspect ratio.

4. The computer-implemented method of claim 3, wherein the image strip of pixels is one pixel wide.

5. The computer-implemented method of claim 1, wherein widths of image strips assembled to form the equirectangular image vary.

6. The computer-implemented method of claim 1, wherein the image strip of pixels is formed from a single image acquired using the virtual camera.

7. The computer-implemented method of claim 1, wherein the image strip of pixels is formed from two or more images acquired using the virtual camera at different pitch angles.

8. The computer-implemented method of claim 1, further comprising:
mapping the equirectangular image to an interior of a sphere; and
visually presenting, via a display, a spherically-mapped view of the equirectangular image to simulate a 3D view of the 3D virtual environment.

9. The computer-implemented method of claim 1, further comprising:
specifying a plurality of different 3D virtual positions of the virtual camera in the 3D virtual environment; and
for each specified 3D virtual position:
for each of a plurality of different yaw angles rotated about an axis of rotation extending through the specified 3D virtual position, using the virtual camera to acquire an image frame of the 3D virtual environment from the 3D virtual position and extract an image strip of pixels from the image frame, the image strip of pixels being parallel to the axis of rotation;

assembling image strips of pixels of the 3D environment extracted from a sequence of image frames acquired at the plurality of different yaw angles side by side according to the sequence of image frames corresponding to the plurality of different yaw angles to form an equirectangular image of the 3D virtual environment from the specified 3D virtual position; and outputting the equirectangular image of the 3D virtual environment.

10. The computer-implemented method of claim 1, further comprising:

changing aspects of one or more 3D models of the 3D virtual environment to change a visual aspect of the 3D virtual environment;

for each of the plurality of different yaw angles rotated about the axis of rotation extending through the 3D virtual position, using the virtual camera to re-acquire an image frame of the 3D virtual environment from the 3D virtual position and extract an image strip of pixels from the image frame, the image strip of pixels being parallel to the axis of rotation;

assembling the image strips of pixels of the 3D environment extracted from a sequence of image frames re-acquired at the plurality of different yaw angles side by side according to the sequence of image frames corresponding to the plurality of different yaw angles to form an equirectangular image of the changed 3D virtual environment from the specified 3D virtual position; and outputting the equirectangular image of the changed 3D virtual environment.

11. A computer comprising:

a logic subsystem;

a storage subsystem comprising instructions executable by the logic subsystem to:

specify a three-dimensional (3D) virtual position of a virtual camera in a 3D virtual environment;

for each of a plurality of different yaw angles rotated about an axis of rotation extending through the 3D virtual position, use the virtual camera to acquire an image frame of the 3D virtual environment from the 3D virtual position and extract an image strip of pixels from the image frame, the image strip of pixels being parallel to the axis of rotation;

assemble image strips of pixels of the 3D environment extracted from a sequence of image frames acquired at the plurality of different yaw angles side by side according to the sequence of image frames corresponding to the plurality of different yaw angles to form an equirectangular image of the 3D virtual environment from the specified 3D virtual position; and output the equirectangular image of the 3D virtual environment.

12. The computer of claim 11, wherein the plurality of different yaw angles collectively spans a 360° rotation about the axis.

13. The computer of claim 11, wherein the equirectangular image has a 2:1 aspect ratio, and wherein the image strip of pixels are each one pixel wide.

14. The computer of claim 11, wherein the image strip of pixels is formed from a single image acquired using the virtual camera.

15. The computer of claim 11, wherein the image strip of pixels is formed from two or more images acquired using the virtual camera at different pitch angles.

16. The computer of claim 11, wherein the instructions are further executable by the logic subsystem to:

map the equirectangular image to an interior of a sphere; and visually present, via a display, a spherically-mapped view of the equirectangular image to simulate a 3D view of the 3D virtual environment.

17. The computer of claim 11, wherein the instructions are further executable by the logic subsystem to:

specify a plurality of different 3D virtual positions of the virtual camera in the 3D virtual environment; and for each specified 3D virtual position:

for each of a plurality of different yaw angles rotated about an axis of rotation extending through the specified 3D virtual position, use the virtual camera to acquire an image frame of the 3D virtual environment from the 3D virtual position and extract an image strip of pixels from the image frame, the image strip of pixels being parallel to the axis of rotation;

assemble image strips of pixels of the 3D environment extracted from a sequence of image frames captured at the plurality of different yaw angles side by side according to the sequence of image frames corresponding to the plurality of different yaw angles to form an equirectangular image of the 3D virtual environment from the specified 3D virtual position; and output the equirectangular image of the 3D virtual environment.

18. The computer of claim 11, wherein the instructions are further executable by the logic subsystem to:

change aspects of one or more 3D models of the 3D virtual environment to change a visual aspect of the 3D virtual environment;

for each of the plurality of different yaw angles rotated about an axis of rotation extending through the 3D virtual position, use the virtual camera to re-acquire an image frame of the 3D virtual environment from the 3D virtual position and extract an image strip of pixels from the image frame, the image strip of pixels being parallel to the axis of rotation;

assemble the image strips of pixels of the 3D environment extracted from a sequence of image frames re-acquired at the plurality of different yaw angles side by side according to the sequence of image frames corresponding to the plurality of different yaw angles to form an equirectangular image of the changed 3D virtual environment from the specified 3D virtual position; and output the equirectangular image of the changed 3D virtual environment.

19. A non-transitory computer-readable storage device holding instructions executable by a processor to:

specify a three-dimensional (3D) virtual position of a virtual camera in a 3D virtual environment;

for each of a plurality of different yaw angles rotated about an axis of rotation extending through the 3D virtual position, use the virtual camera to acquire an image frame of the 3D virtual environment from the 3D virtual position and extract an image strip of pixels from the image frame, the image strip of pixels being parallel to the axis of rotation:

assemble image strips of pixels of the 3D environment extracted from a sequence of image frames acquired at the plurality of different yaw angles side by side according to the sequence of image frames corresponding to the plurality of different yaw angles to form an equirectangular image of the 3D virtual environment from the specified 3D virtual position; and output the equirectangular image of the 3D virtual environment.

20. The computer-readable physical storage device of claim 19, wherein the computer-readable physical storage device holds instructions executable by the processor to:

change aspects of one or more 3D models of the 3D virtual environment to change a visual aspect of the 3D virtual environment;

for each of the plurality of different yaw angles rotated about an axis of rotation extending through the 3D virtual position, use the virtual camera to re-acquire an image frame of the 3D virtual environment from the 3D virtual position and extract an image strip of pixels from the image frame, the image strip of pixels being parallel to the axis of rotation;

assemble the image strips of pixels of the 3D environment extracted from a sequence of image frames re-acquired at the plurality of different yaw angles side by side according to the sequence of image frames corresponding to the plurality of different yaw angles to form an equirectangular image of the changed 3D virtual environment from the specified 3D virtual position; and output the equirectangular image of the changed 3D environment.

* * * * *